US008156024B1

(12) United States Patent
Leverett

(10) Patent No.: US 8,156,024 B1
(45) Date of Patent: Apr. 10, 2012

(54) SYSTEMS AND METHODS FOR DIRECTING DISPOSITION OF CERTIFICATE OF DEPOSIT

(75) Inventor: Janice Leverett, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 391 days.

(21) Appl. No.: 12/237,436

(22) Filed: Sep. 25, 2008

Related U.S. Application Data

(62) Division of application No. 12/131,431, filed on Jun. 2, 2008.

(51) Int. Cl.
*G06Q 40/00* (2006.01)
(52) U.S. Cl. ............ 705/35; 705/1; 705/14.36; 705/31; 705/36; 705/37; 705/38; 705/40; 705/42; 705/65
(58) Field of Classification Search ........... 705/1, 14.36, 705/31, 35, 36, 37, 38, 40, 42, 65
See application file for complete search history.

(56) References Cited

U.S. PATENT DOCUMENTS

| | | | |
|---|---|---|---|
| 6,330,544 B1* | 12/2001 | Walker et al. ............. 705/14.36 |
| 6,847,935 B1 | 1/2005 | Solomon et al. |
| 7,003,479 B2 | 2/2006 | Cowell et al. |
| 2002/0046186 A1* | 4/2002 | Nishio et al. ..................... 705/65 |
| 2002/0059123 A1* | 5/2002 | Dunning et al. ................. 705/35 |
| 2002/0059141 A1* | 5/2002 | Davies et al. ................... 705/42 |
| 2002/0062270 A1 | 5/2002 | Star |
| 2002/0198843 A1 | 12/2002 | Wang et al. |
| 2003/0088512 A1* | 5/2003 | Hoter-Ishay ..................... 705/40 |
| 2003/0225692 A1 | 12/2003 | Bosch et al. |
| 2003/0233246 A1* | 12/2003 | Snapp et al. ..................... 705/1 |
| 2004/0006542 A1 | 1/2004 | Gilliam et al. |
| 2004/0143536 A1* | 7/2004 | Haberle .......................... 705/37 |
| 2004/0205012 A1* | 10/2004 | O'Connor ....................... 705/36 |
| 2005/0044038 A1 | 2/2005 | Whiting et al. |
| 2005/0075971 A1* | 4/2005 | Delaney .......................... 705/38 |
| 2005/0108120 A1 | 5/2005 | Malka et al. |
| 2005/0108154 A1 | 5/2005 | McLiesh et al. |
| 2006/0161496 A1 | 7/2006 | Foster et al. |
| 2006/0190395 A1 | 8/2006 | Solomon |
| 2006/0235776 A1* | 10/2006 | Temme ........................... 705/31 |

(Continued)

OTHER PUBLICATIONS

"Frost Bank, Savings, CDs, Account Features", 2 pages printed on Jan. 4, 2008 and submitted by the Applicant as part of its original application on Sep. 25, 2008.*

(Continued)

*Primary Examiner* — Mary Cheung
*Assistant Examiner* — Sanjeev Malhotra
(74) *Attorney, Agent, or Firm* — Kilpatrick Townsend & Stockton LLP

(57) ABSTRACT

The disposition of funds in a certificate of deposit (CD) may be specified at or near the time the CD is applied for. The depositor may specify disposition of funds such as transferring the funds to an account, paying a bill, donating the funds to charity, rolling over the funds into a new CD. The depositor may specify that a particular portion of the funds are to be rolled over, and that the remainder of funds are to be disposed of in a specified manner. If the depositor elects to roll over some or all of the funds in the CD, the depositor may specify how many times the CD is to be rolled over. Instructions for disposition of funds may be received through a web site, through e-mail, on paper, etc.

21 Claims, 4 Drawing Sheets

U.S. PATENT DOCUMENTS

2007/0055602 A1 3/2007 Mohn
2007/0239583 A1 10/2007 Williams

OTHER PUBLICATIONS

Jumbo Certificate of Deposit [Retrieved on Jan. 15, 2008], [Retrieved on Jan. 16, 2008], Retrieved from the internet <URL: http://www.answers.com/topic/jumbo-certificate-of-deposit?cat=biz-fin>.
http://www.bankofamerica.com/deposits/checksave/index.cfm?template=cd_riskfree (retrieved on Jan. 4, 2008).
http://www.bankofamerica.com/deposits/checksave/index.cfm?template=cd_10 (retrieved on Jan. 4, 2008).
http://www.wachovia.com/personal/page/0,,11_481_524,00.html (retrieved on Jan. 4, 2008).
http://www.wachovia.com/personal/page/0,,11_481_524_2283,00.html (retrieved on Jan. 4, 2008).
http://www.wachovia.com/personal/page/0,,11_481_524_11901,00.html (retrieved on Jan. 4, 2008).
http://www.wachovia.com/personal/page/0,,11_481_524_2286,00.html (retrieved on Jan. 4, 2008).
http://www.bankofamerica.com/deposits/checksave/index.cfm?template=save_overview&c (retrieved on Jan. 4, 2008).
http://www.wamu.com/personal/certificate_deposit/default.asp (retrieved on Jan. 4, 2008).
http://www.wamu.com/personal/certificate_deposit/traditional_cd/defaultasp (retrieved on Jan. 4, 2008).
http://www.frostbank.com/cgi-bin/ecomm/portal/ep/productPages.do?action=features&gro (retrieved on Jan. 4, 2008).

* cited by examiner

100

Welcome to ABCBank.com

Enter amount of CD to purchase: $ — 102

Check term of CD:
- ☐ 1 month
- ☐ 2 months
- ☐ 3 months
- ☐ 6 months
- ☐ 1 year
  ⋮
- ☐ 10 years

104

106

Rollover: ☐ No  ☐ Yes - [ ] times   108  110

112 ☐ Full amount on maturity  ☐ Original amount
    ☐ Other: $ [_____]   112

114

116

118 ☐ Transfer funds to acct # [_____] 120
    ☐ Pay bill – acct # [_____] 122
    ☐ Contribute to charity – Name: [_____]
    124

*FIG. 1*

SYSTEMS AND METHODS FOR DIRECTING DISPOSITION OF CERTIFICATE OF DEPOSIT

CROSS-REFERENCE TO RELATED APPLICATIONS

The present application is a divisional patent application of U.S. patent application Ser. No. 12/131,431 filed Jun. 2, 2008, the entirety of which is hereby incorporated by reference herein. Further, this application is related by subject matter to that disclosed in the following commonly assigned application, the entirety of which is hereby incorporated by reference herein: U.S. patent application Ser. No. 12/237,442, filed concurrently herewith and entitled "SYSTEMS AND METHODS FOR DIRECTING DISPOSITION OF CERTIFICATE OF DEPOSIT".

BACKGROUND

A Certificate of Deposit ("CD") is a financial instrument that a depositor may purchase from a financial institution. The CD has a specific term (e.g., three months, one year, etc.) during which it pays a particular rate of interest. The CD is said to mature at the end of the term. Upon maturity, the funds in the CD are withdrawn.

However, more often than not, the default disposition of CD funds at the time of maturity is to rollover the funds into another CD. For example, the terms of the CD may state that the funds in the CD upon maturity are rolled over into another CD of the same length term, at whatever interest rate the financial institution is paying for CDs of that term length at the time of the rollover. There is often a grace period—e.g., two weeks after the maturity date—during which the depositor may opt out of the rollover. Financial institutions typically do not send their depositors reminders or normally do not notify their depositors of an impending maturity, so a depositor who wants to exercise the opt-out would have to rely on a calendar to remind himself or herself of the maturity date. However, these types of reminders may be prone to error, or may otherwise be unreliable. Moreover, many financial institutions expect such an opt-out to be exercised in person during banking hours, making it difficult for some people to exercise the opt-out provision. Thus, many CDs are not disposed of in accordance with the depositors' intentions.

SUMMARY

Disposition of a CD may be specified at the time the CD is purchased. When a depositor purchases the CD, the depositor may be offered various options as to how the funds in the CD are to be disposed of when the CD matures. For example, the depositor may specify that the funds in the CD are to be transferred to a particular account, used to a pay bill, donated to a charity, etc. The depositor may also specify the number of times that the CD is to be rolled over before disposition occurs. The depositor may specify a split of the funds, so that some amount of money is rolled over and the remainder is disposed of according to the depositor's instructions.

The instructions could be received in any manner. For example, the CD could be purchased through a web site, which offers the depositor various options for disposition upon maturity. The CD could also be purchased in a paper transaction. Regardless of the manner in which the CD is purchased, instructions for disposition could be received through a web site, on paper, through an e-mail, etc. The instructions could be stored, for example, in a computer system of a financial institution that issues the CD. The stored instructions could be used at the time of maturity to determine how the funds in the CD are to be handled.

This summary is provided to introduce a selection of concepts in a simplified form that are further described in the detailed description. This summary is not intended to identify key features or essential features of the claimed subject matter, nor is it intended to be used to limit the scope of the claimed subject matter.

BRIEF DESCRIPTION OF THE DRAWINGS

FIG. 1 is a block diagram of an example web page that a depositor may use to apply to purchase a CD and to specify disposition of funds upon maturity.

DETAILED DESCRIPTION

Figure 2:
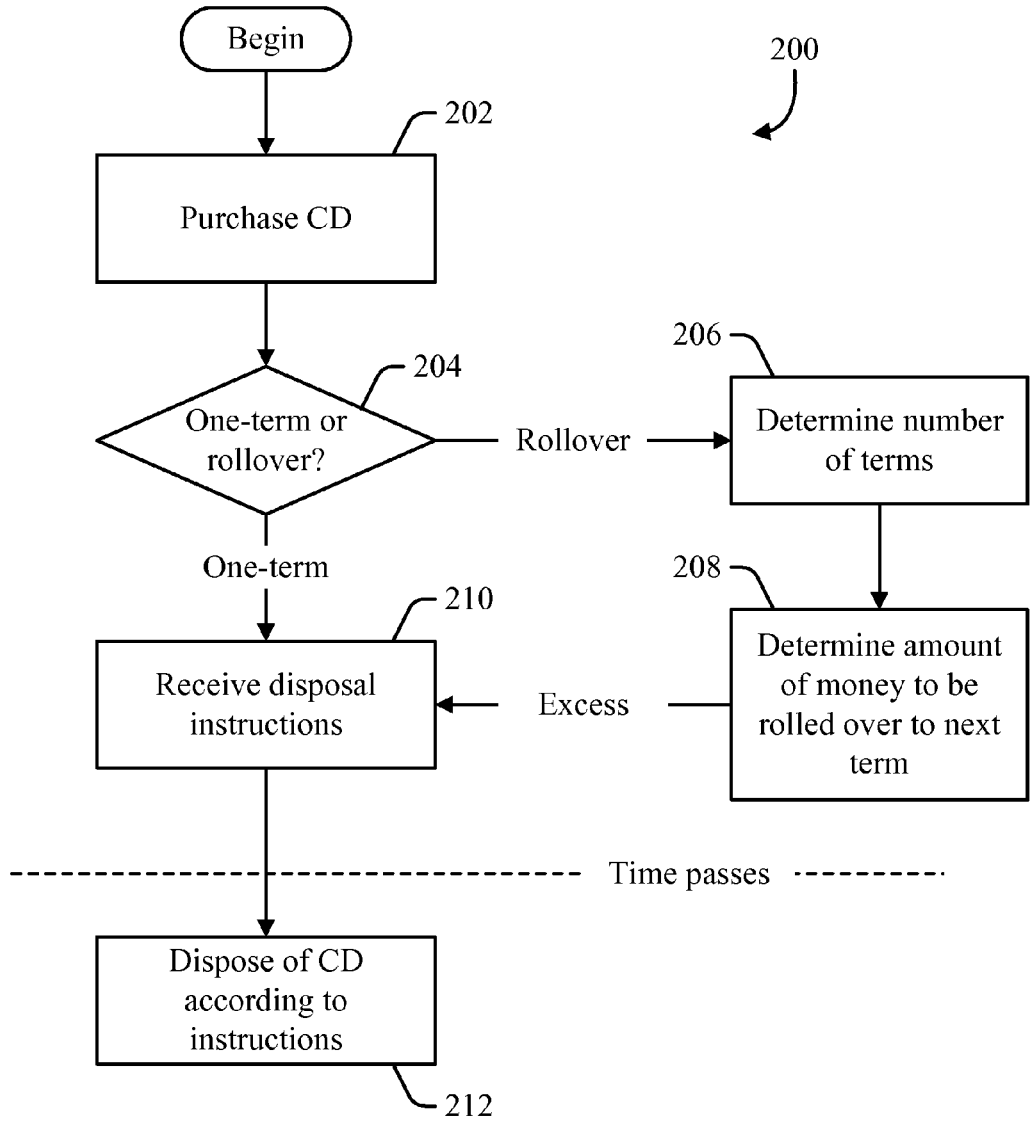
FIG. 2 is a flow diagram of an example process in which a CD is purchased and in which instructions for disposition upon maturity are received.

A Certificate of Deposit ("CD") normally allows a depositor to obtain a specific interest rate on money for a specific term, in exchange for agreeing to keep the money on deposit for the length of that term. When the term expires, the money in the CD is disposed of in some manner. Normally, there is a grace period at the end of the term (e.g., two weeks) during which the depositor may withdraw the funds, or otherwise direct their disposition. If the depositor does not exercise this option within the grace period, the funds in the CD may be rolled over into a new CD of the same length term as the original, at whatever interest rate the financial institution is paying for CDs of that term length. A depositor, however, may wish to specify disposition of the funds in the CD at the time the CD is applied for. The subject matter described herein may allow a depositor to specify disposition of the funds in a CD at or near the time the CD is issued.

Turning now to the drawings, FIG. 1 shows an example web page 100 that may be used to apply to purchase a CD, and to specify disposition of the CD's funds upon maturity. In the example of FIG. 1, web page 100 is a page on the web site of a financial institution ("ABCBank.com", in this example). Web page 100 may be delivered to a customer's browser using, for example, a web server that the financial institution operates. Web page 100 may be used by a depositor (including both existing depositors at the financial institution, and potential depositors who do not yet have funds on deposit) to apply to purchase a CD. Web page 100 contains various spaces to enter information relating to an application for a CD, and also relating to disposition of the CD upon maturity. Web page 100 offers various options from which a user may select, and the selections may become part of a specification of the CD.

Web page 100 contains data-entry field 102 in which the depositor may enter the amount of money to be deposited in the CD. Web page 100 may also have a plurality of check boxes 104 that may be used to specify the term of the CD. The term could also be specified in other ways, such as through a drop-down menu that specifies different terms, or through a data-entry field in which the depositor may enter the term.

Section 106 of page 100 allows a depositor to specify whether the CD is to rollover upon maturity. For example, section 106 may contain check boxes 108 in which the depositor may specify whether the CD is to rollover. Section 106 may also contain data-entry field 110, which, if the depositor wants the CD to rollover, allows the depositor to specify the number of times that the rollover is to occur. Moreover a depositor might be allowed to specify what portion of the funds available on maturity are to be rolled over. For example, check boxes 112 might allow the depositor to specify that the full value of the CD upon maturity is to be rolled over, or that the original deposit amount is to be rolled over, or that some other amount is to be rolled over (which could be specified in data-entry field 114). For example, a depositor might want the principal and interest to keep accumulating in a succession of CDs, in which case the depositor could check the box indicating "full amount." Or, the depositor might start with some amount (e.g., $1,000), and may want to rollover that same amount upon maturity. In this case, the depositor could check "original amount." Or, the depositor may want to specify a particular amount to be rolled over, in which case the depositor could check "other" and specify an amount of money to be rolled over in data-entry field 114. Specifying "full amount", "original amount", a percentage of funds, a specific amount of dollars, etc., are all examples of specifying an amount of money to be rolled over.

Section 116 of page 100 allows a depositor to specify how funds are to be disposed of upon maturity of the CD. The choice of disposition may apply to CDs that are not rolled over, or may apply to excess funds in the event that less than the entire maturity value of the CD is rolled over (e.g., as might be specified using check boxes 112 and/or data-entry field 114). For example, check boxes 118 could be used to specify dispositions such as:

- transferring the funds to a particular account (in which case the account number could be specified in data-entry field 120);
- paying a bill (in which case the account number associated with the bill could be specified in data-entry field 122);
- contributing to charity (in which case the name of the charity could be specified in data-entry field 124).

FIG. 2 shows an example process 200 in which a CD is purchased and instructions for disposal upon maturity are collected and processed. At 202, a CD is purchased. This purchase may be performed, for example, through a web site, such as that of which page 100 (shown in FIG. 1) is a part. As another example, the purchase of the CD may occur on paper, by telephone, etc. At 204, it is determined whether the CD is to be for one term, or the balance of the CD (or some portion of the balance) is to be rolled over upon maturity. If the CD is to be rolled over, then the number of terms for which the CD is to be rolled over is determined at 206. Also, a determination is made (at 208) as to the amount of money to be rolled over to the next term (e.g., the balance on maturity, the original amount, some other amount, etc., as discussed previously in connection with FIG. 1). The excess of the proceeds, if any (i.e., the portion that is not rolled over), may be subject to disposal instructions that are received at 210. Moreover, if it is determined at 204, that the CD is to be for one term, then instructions for disposal of the CD may likewise be received at 210.

Examples of instructions for disposal have been previously discussed in connection with FIG. 1. These instructions may include transferring the funds in the CD to another account, using the funds to pay a bill, donating the funds to charity, or disposing of the funds in any other manner. These instructions for disposal may be applied to any funds remaining at the end of a one-term CD, at the end of the last term of a multi-term (rolled over) CD, or to any excess funds that are not rolled over at the end of a term.

The depositor's instructions may be collected, for example, using web page 100 (shown in FIG. 1). However, these requests could be collected in any manner, such as on paper, via e-mail, via telephone, etc. The manner in which the funds are to be disposed of, and the request (if any) to rollover the CD for some number of terms, are examples of actions that may be specified.

At some point in time, the CD is issued. Then time passes until the term (or terms) of the CD expire. After time passes, the funds in the CD may be disposed of (at 212) in accordance with the instructions that were received at 210.

Figure 3:
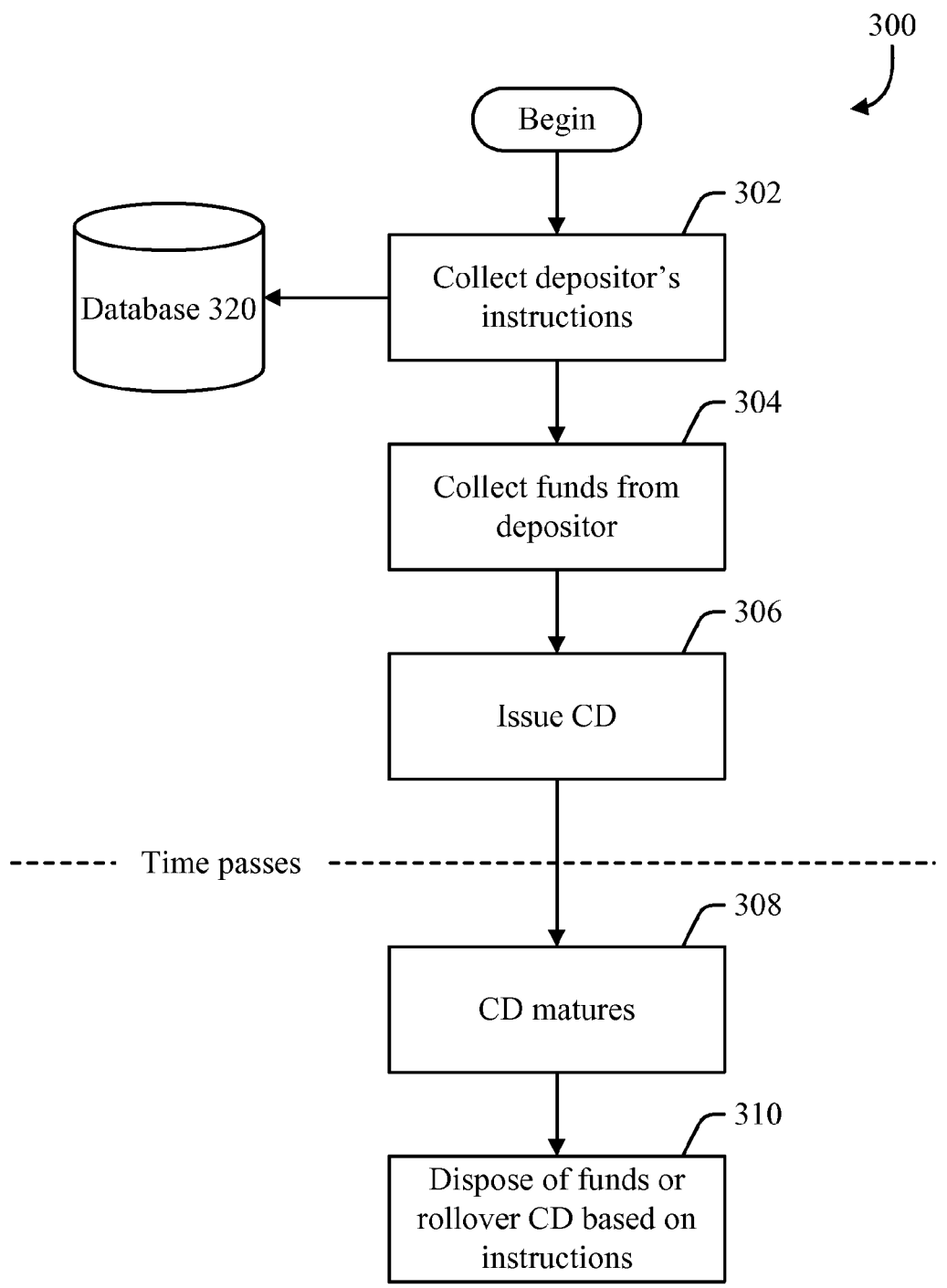
FIG. 3 is a flow diagram of an example process that may be performed by a financial institution to issue a CD and to collect instructions as to how the funds in the CD are to be disposed.

FIG. 3 shows an example process 300 that may be performed by a financial institution to issue a CD and to collect instructions as to how the funds in the CD are to be disposed of. At 302, a depositor's instructions as to the CD to be purchased, and how the funds are to be disposed of upon maturity, are collected. For example, the information collected may include the amount of money to be placed in the CD, the term-length of the CD, the number of times the CD is to be rolled over, the amount to be placed in each rollover CD, how funds are to be disposed of upon maturity, etc. FIG. 1, discussed previously, shows an example of a way of collecting information and of various types of information that could be collected. However, any type of information could be collected, and the collection could occur in any manner. Once the information is collected, it may be stored in database 320. Database 320 may be a database operated by the financial institution from which the CD is being purchased.

At 304, funds are collected from the depositor. For example, if the depositor wants to purchase a $1,000 CD, then $1,000 may be collected via check, cash, wire, clearinghouse transfer, etc. At 306, the CD is issued.

After the CD is issued, time passes. After the length of the CD's term has passed, the CD matures (at 308). Then, the funds in the CD may be disposed of, rolled over, or otherwise handled, based on the depositor's instructions (at 310). These instructions, which may have been created at the time the CD was applied for or issued, may be retrieved from database 320. For example, the financial institution may distribute the funds (e.g., to an account, a creditor, a charity, etc.) in accordance with instructions previously received. Or, if rollover of some or all of the fund is specified in the instructions, then the financial institution may determine whether the funds have already been rolled over the number of times specified. If the CD has not already been rolled over that number of times, then the financial institution may initiate a new CD with the funds. If rollover of part of the funds is specified in the instructions, then any remaining/excess funds may be distributed in accordance with the instructions received.

Figure 4:
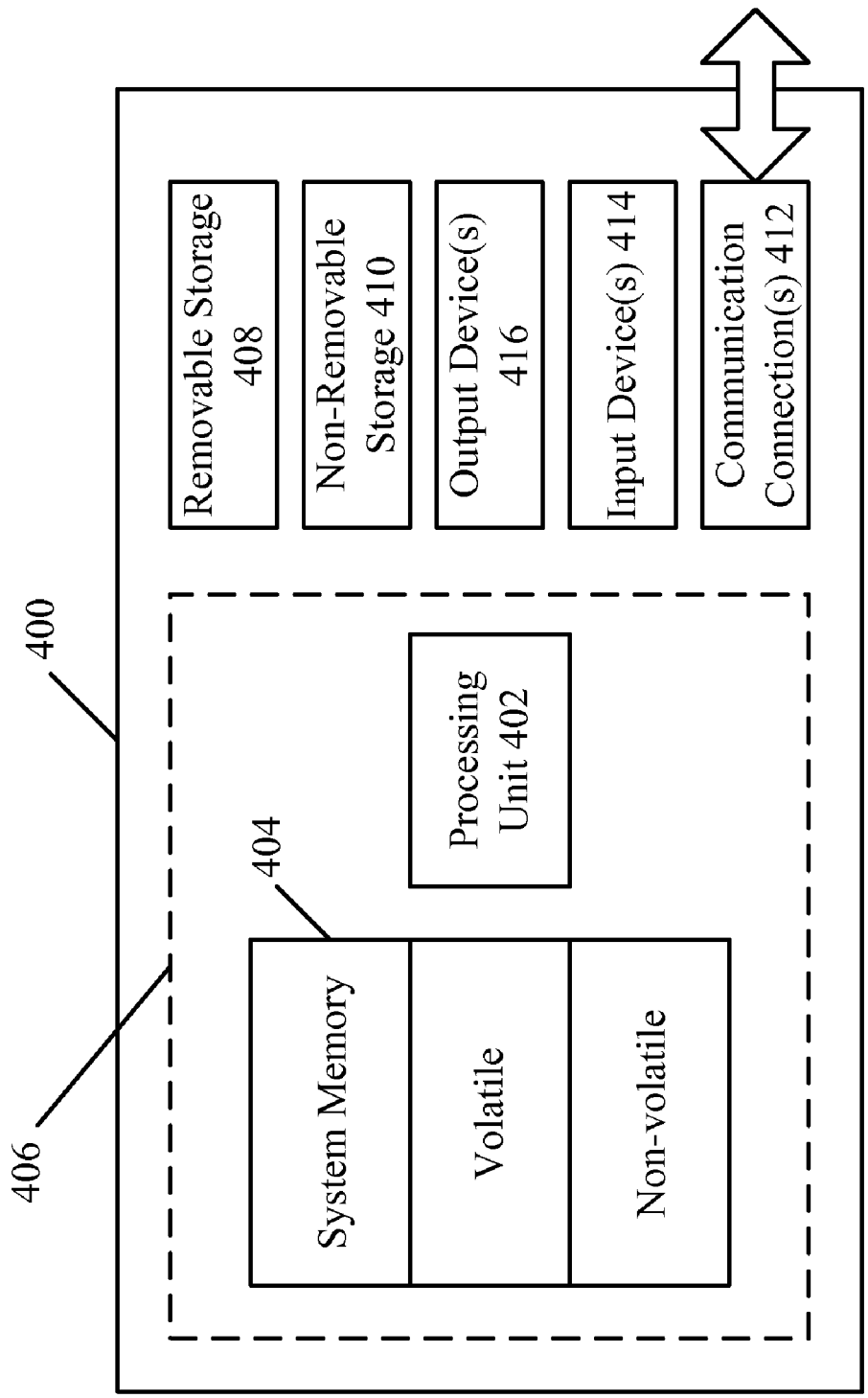
FIG. 4 is a block diagram of an example computing environment that may be used in connection with implementations of the subject matter described herein.

The subject matter described herein may be implemented through the use of a computer system, or other type of device that has some computing mechanism(s). FIG. 4 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media may be any available media that may be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) may be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts previously described. Rather, the specific features and acts previously described are disclosed as example forms of implementing the claims.

The invention claimed is:

1. A system comprising:
   a processor and a memory coupled to the processor;
   an issuance determination module deployed in the memory and executed by the processor to determine that a certificate of deposit issued to a depositor has matured;
   a retrieval module deployed in the memory and executed by the processor to retrieve, from a database, a certificate of deposit post maturity instruction associated with the certificate of deposit that was created in accordance with issuance of the certificate of deposit;
   a roll over determination module deployed in the memory and executed by the processor to determine at least one roll over term and an amount of funds associated with the rollover term when a roll over of the certificate of deposit is indicated in the retrieved certificate of deposit post maturity instruction; and a rollover excess disposition module deployed in the memory and executed by the processor to dispose of a non-rolled-over portion of funds associated with the certificate of deposit in accordance with the retrieved certificate of deposit post maturity instruction without receipt of an additional instruction from the depositor based on a determination that the certificate of deposit has matured.

2. The system of claim 1, wherein the certificate of deposit post maturity instruction specifies an account to which the funds are to be transferred, and disposition of the portion of the funds includes:

transfer of the portion of funds associated with the certificate of deposit by the processor to the account in accordance with the certificate of deposit post maturity instruction without receipt of an additional instruction from the depositor based on a determination that the certificate of deposit has matured.

3. The system of claim 1, wherein the certificate of deposit post maturity instruction specifies a charity to which the funds are to be paid, and disposition of the portion of the funds includes:

pay the portion of the funds associated with the certificate of deposit to the charity in accordance with the certificate of deposit post maturity instruction without receiving an additional instruction from the depositor based on a determination that the certificate of deposit has matured.

4. The system of claim 1, further comprising:

an instruction receiver module deployed in the memory and executed by the processor to receive the certificate of deposit post maturity instruction through a web site through which an application for the certificate of deposit is made; and a storage module deployed in the memory and executed by the processor to store the certificate of deposit post maturity instruction in the database.

5. The system of claim 1, further comprising:

an instruction receiver module deployed in the memory and executed by the processor to receive the certificate of deposit post maturity instruction in an e-mail; and a storage module deployed in the memory and executed by the processor to store the certificate of deposit post maturity instruction in the database.

6. The system of claim 1, further comprising:

a roll over module deployed in memory and executed by the processor to receive an indication of a first amount of money to be rolled over when the certificate of deposit matures, the certificate of deposit having a second amount of money upon maturity, the first amount of money being less than the second amount of money;

a storage module deployed in the memory and executed by the processor to store the certificate of deposit post maturity instruction in the database, the certificate of deposit post maturity instruction being based on the indication; and a certificate issuance module deployed in the memory and executed by the processor to issue an additional certificate of deposit using the first amount of money when the determination is made that the certificate of deposit has matured, wherein the disposing of the portion of the funds includes disposing of the funds associated with the certificate of deposit in excess of the first amount of money by the processor in accordance with the certificate of deposit post maturity instruction without receiving the additional instruction from the depositor based on the determination that the certificate of deposit has matured.

7. The system of claim 1, further comprising:

a roll over module deployed in the memory and executed by the processor to receive an indication of a number of times that the certificate of deposit is to be rolled over;

a storage module deployed in the memory and executed by the processor to store the certificate of deposit post maturity instruction in the database, the certificate of deposit post maturity instruction being based on the indication; and a times determination module deployed in the memory and executed by the processor to determine that the certificate of deposit being determined to have been rolled over fewer than the number of times when the determination is made that the certificate of deposit has matured, wherein the disposition of the portion of the funds includes issuing an additional certificate of deposit being initiated using the portion of funds associated with the certificate of deposit in accordance with the certificate of deposit post maturity instruction without receiving the additional instruction from the depositor based on the determination that the certificate of deposit has matured.

8. A processor-implemented method comprising:

determining by a processor that a certificate of deposit issued to a depositor has matured;

retrieving, from a database by the processor, a certificate of deposit post maturity instruction associated with the certificate of deposit that was created in accordance with issuance of the certificate of deposit;

determine at least one roll over term and an amount of funds associated with the rollover term when a roll over of the certificate of deposit is indicated in the retrieved certificate of deposit post maturity instruction; and disposing of at least a rollover excess portion of funds associated with the certificate of deposit by the processor in accordance with the certificate of deposit post maturity instruction without receiving an additional instruction from the depositor based on a determination that the certificate of deposit has matured.

9. The method of claim 8, wherein the certificate of deposit post maturity instruction specifies an account to which the funds are to be transferred, the disposing of the portion of the funds comprises:

transferring the portion of the funds associated with the certificate of deposit by the processor to the account in accordance with the certificate of deposit post maturity instruction without receiving an additional instruction from the depositor based on a determination that the certificate of deposit has matured.

10. The method of claim 8, wherein the certificate of deposit post maturity instruction specifies a charity to which the funds are to be paid, the disposing of the portion of the funds comprises:

paying the portion of the funds associated with the certificate of deposit by the processor to the charity in accordance with the certificate of deposit post maturity instruction without receiving an additional instruction from the depositor based on a determination that the certificate of deposit has matured.

11. The method of claim 8, further comprising:

receiving the certificate of deposit post maturity instruction through a web site through which an application for the certificate of deposit is made; and storing the certificate of deposit post maturity instruction in the database.

12. The method of claim 8, further comprising:

receiving the certificate of deposit post maturity instruction in an e-mail; and storing the certificate of deposit post maturity instruction in the database.

13. The method of claim 8, further comprising:
receiving an indication of a first amount of money to be rolled over when the certificate of deposit matures, the certificate of deposit having a second amount of money upon maturity, the first amount of money being less than the second amount of money;
storing the certificate of deposit post maturity instruction in the database, the certificate of deposit post maturity instruction being based on the indication of; and
when the determination is made that the certificate of deposit has matured, issuing an additional certificate of deposit using the first amount of money,
wherein the disposing of the portion of the funds includes disposing of the funds associated with the certificate of deposit in excess of the first amount of money by the processor in accordance with the certificate of deposit post maturity instruction without receiving the additional instruction from the depositor based on the determination that the certificate of deposit has matured.

14. The method of claim 8, further comprising:
receiving an indication of a number of times that the certificate of deposit is to be rolled over;
storing the certificate of deposit post maturity instruction in the database, the certificate of deposit post maturity instruction being based on the indication; and
when the determination is made that the certificate of deposit has matured, determining that the certificate of deposit has been rolled over fewer than the number of times,
wherein the disposing of the portion of the funds includes issuing an additional certificate of deposit using the portion of funds associated with the certificate of deposit by the processor in accordance with the certificate of deposit post maturity instruction without receiving the additional instruction from the depositor based on the determination that the certificate of deposit has matured.

15. A computer-readable medium comprising computer-readable instructions, which when executed by a processor, cause the processor to:
determine that a certificate of deposit issued to a depositor has matured;
retrieve, from a database, a certificate of deposit post maturity instruction associated with the certificate of deposit that was created in accordance with issuance of the certificate of deposit;
determine at least one roll over term and an amount of funds associated with the rollover term when a roll over of the certificate of deposit is indicated in the retrieved certificate of deposit post maturity instruction; and
dispose of at least a rollover excess portion of funds associated with the certificate of deposit in accordance with the certificate of deposit post maturity instruction without receiving an additional instruction from the depositor based on a determination that the certificate of deposit has matured.

16. The computer-readable medium of claim 15, wherein the certificate of deposit post maturity instruction specifies an account to which the funds are to be transferred, and wherein disposition of the portion of the funds causes the processor to:
transfer the portion of the funds associated with the certificate of deposit to the account in accordance with the certificate of deposit post maturity instruction without receiving an additional instruction from the depositor based on a determination that the certificate of deposit has matured.

17. The computer-readable medium of claim 15, wherein the certificate of deposit post maturity instruction specifies a charity to which the funds are to be paid, and wherein disposition of the portion of the funds causes the processor to:
pay the portion of the funds associated with the certificate of deposit by the processor to the charity in accordance with the certificate of deposit post maturity instruction without receiving an additional instruction from the depositor based on a determination that the certificate of deposit has matured.

18. The computer-readable medium of claim 15, further comprising computer-readable instructions that cause the processor to:
receive said the certificate of deposit post maturity instruction through a web site through which an application the certificate of deposit is made; and
store the certificate of deposit post maturity instruction in the database.

19. The computer-readable medium of claim 15, further comprising computer-readable instructions that cause the processor to:
receive the certificate of deposit post maturity instruction in an e-mail; and
store the certificate of deposit post maturity instruction in the database.

20. The computer-readable medium of claim 15, further comprising computer-readable instructions that cause the processor to:
receive an indication of a first amount of money to be rolled over when the certificate of deposit matures, the certificate of deposit having a second amount of money upon maturity, the first amount of money being less than the second amount of money;
store the certificate of deposit post maturity instruction in the database, the certificate of deposit post maturity instruction being based on the indication; and
when the determination is made that the certificate of deposit has matured, issue an additional certificate of deposit using the first amount of money,
wherein disposition of the portion of the funds includes the disposition of the funds associated with the certificate of deposit in excess of the first amount of money in accordance with the certificate of deposit post maturity instruction without receiving the additional instruction from the depositor based on the determination that the certificate of deposit has matured.

21. The computer-readable medium of claim 15, further comprising computer-readable instructions that cause the processor to:
receive an indication of a number of times that the certificate of deposit is to be rolled over;
store the certificate of deposit post maturity instruction in the database, the certificate of deposit post maturity instruction being based on the indication; and
when the determination is made that the certificate of deposit has matured, determine that the certificate of deposit has been rolled over fewer than the number of times,
wherein the disposition of the portion of the funds includes issuance of an additional certificate of deposit using the portion of funds associated with the certificate of deposit in accordance with the certificate of deposit post maturity instruction without receiving the additional instruction from the depositor based on the determination that the certificate of deposit has matured.

* * * * *